United States Patent [19]

Forsythe

[11] Patent Number: 5,249,103
[45] Date of Patent: Sep. 28, 1993

[54] MODULAR TRANSACTION TERMINAL HAVING A DOCKING SURFACE WITH A PLURALITY OF PARALLEL GROOVES

[75] Inventor: Donald L. Forsythe, Dacula, Ga.

[73] Assignee: NCR Corporation, Dayton, Ohio

[21] Appl. No.: 908,112

[22] Filed: Jul. 2, 1992

[51] Int. Cl.$^5$ .......................... H05K 7/02; H05K 7/10
[52] U.S. Cl. ..................................... 361/730; 361/680; 361/681; D18/4; 439/928
[58] Field of Search ....................... D14/100, 105, 107; D18/4; 439/928; 364/405, 708, 709.1, 709.11; 361/380, 390–396, 399, 417, 427, 429; 235/1 D, 2, 6, 7 R, 145 R, 146

[56] References Cited

U.S. PATENT DOCUMENTS

| D. 316,682 | 7/1991 | Eng et al. ..................... D14/107 X |
| 4,527,285 | 7/1985 | Kekas et al. ..................... 361/393 X |
| 4,738,632 | 4/1988 | Schmidt et al. ................. 361/393 X |
| 4,841,412 | 6/1989 | Heyes, Jr. et al. ................... 361/393 |
| 4,853,838 | 8/1989 | Westerman ..................... 361/380 X |
| 4,903,222 | 2/1990 | Carter et al. . |
| 4,937,563 | 6/1990 | Shekita et al. ................... 361/392 X |
| 4,988,851 | 1/1991 | Kohno et al. . |

FOREIGN PATENT DOCUMENTS

| 210963 | 2/1987 | European Pat. Off. ............ 364/405 |
| 3011934 | 10/1981 | Fed. Rep. of Germany ...... 364/405 |

*Primary Examiner*—Leo P. Picard
*Assistant Examiner*—Michael W. Phillips
*Attorney, Agent, or Firm*—Albert L. Sessler, Jr.

[57] ABSTRACT

A modular business terminal comprises a base unit having a docking surface with a number of parallel grooves, on which surface a plurality of detachable terminal modules having elongated projections associated therewith may be positioned and secured by a snap fit connection between the projections and the grooves. The terminal modules may include such devices as a keyboard, a touch screen, a CRT or other type of display, a magnetic stripe reader, a printer, etc. Various arrangements may be employed to provide data coupling between the base unit and the terminal modules, such as infra-red coupling devices, or the use of a cable attached to the terminal module, which cable is retained within the groove which retains the terminal module in position on the docking surface. The base unit may be configured to rest upon a supporting surface, such as a counter, or may be wall mounted. The docking surface may be angled slightly from the horizontal, or may be substantially vertical.

9 Claims, 6 Drawing Sheets

MODULAR TRANSACTION TERMINAL HAVING A DOCKING SURFACE WITH A PLURALITY OF PARALLEL GROOVES

BACKGROUND OF THE INVENTION

The present invention relates to a modular terminal, and more specifically relates to a modular business terminal having a configuration which may readily be altered.

Transaction terminal products for retail and financial markets are designed to be either fully integrated, fully modular, or unified/modular. A unified/modular terminal locates modules such as keyboards, displays, printers, etc. on a surface in a designated position within close proximity to each other as a unified configuration. For a modular configuration, the modules can be removed from this surface, and, with added cable length, the modules can be placed in any desirable position within a work station. In most present arrangements, the modules of a unified/modular terminal can be unified only if located in a specified area on a surface. This surface is usually the top of a cash drawer or the electronics/power supply module of a retail terminal. Therefore, it would be desirable to provide a terminal design which provides the flexibility to locate the terminal modules in a variety of positions.

SUMMARY OF THE INVENTION

The present invention provides a terminal design which provides flexibility for locating terminal modules in a variety of positions. The modules can be replaced to suit various technologies. For example, in the case of displays, a small fluorescent panel can be interchanged with a CRT or a large flat panel LCD with or without touch input. The modules can be unified onto the terminal without additional development effort being directed to the basic terminal. The integration of peripherals not planned for in the original design can be unified onto the surface with existing modules. This flexibility provides the opportunity to arrange the modules to best suit the user.

In the retail and financial environments, the work area is a small and valuable space. Therefore the "footprint" or area of the terminal should be as small as possible. The unified configuration of most retail terminals is large, being based on the size of a traditional cash drawer. In the design of the present invention, the terminal modules "snap" into place onto various surfaces. One surface may be a part of a fully expanded terminal, reflecting that footprint, while another surface is designed to facilitate use of the smallest possible size in a terminal, with, for example, only a processor and a remote power supply. Another configuration may be a wall-mounted terminal to make almost all of the work surface available for other uses, or may be a vertical unit used as the scanning station in a twin checkout set-up, such as is typically used in Japan.

The terminal of the present invention can be converted to a modular configuration of a traditional type by removing the various modules with longer cables and adding standalone supports to the modules where necessary. Moreover, this offering of alternative ways to unify the terminal may reduce the number of modular installations required.

In accordance with one embodiment of the present invention, a modular business terminal having a configuration which may readily be altered comprises a base unit having a docking surface on which are located a plurality of parallel grooves each extending from one side of the docking surface to the other; at least one terminal module, each module having at least one projection which is inserted into one of the grooves of the docking surface to removably attach the terminal module to the base unit; and means for providing a data coupling between the base unit and each attached terminal module.

It is accordingly an object of the present invention to provide a business terminal comprising a base unit and at least one detachable terminal module.

It is another object of the present invention to provide a business terminal having a grooved docking surface to which a plurality of terminal modules may be detachably secured.

Another object of the present invention is to provide a business terminal having a flexible design which permits terminal modules associated therewith to be positioned thereon in a variety of positions.

Another object of the present invention is to provide a terminal having a relatively small "footprint".

Another object of the present invention is to provide a terminal to which terminal modules may be added after installation of the terminal.

With these and other objects, which will become apparent from the following description, in view, the invention includes certain novel features of construction and combinations of parts, preferred forms and embodiments of which are hereinafter described with reference to the drawings which accompany and form a part of this specification.

DETAILED DESCRIPTION

Figure 1:
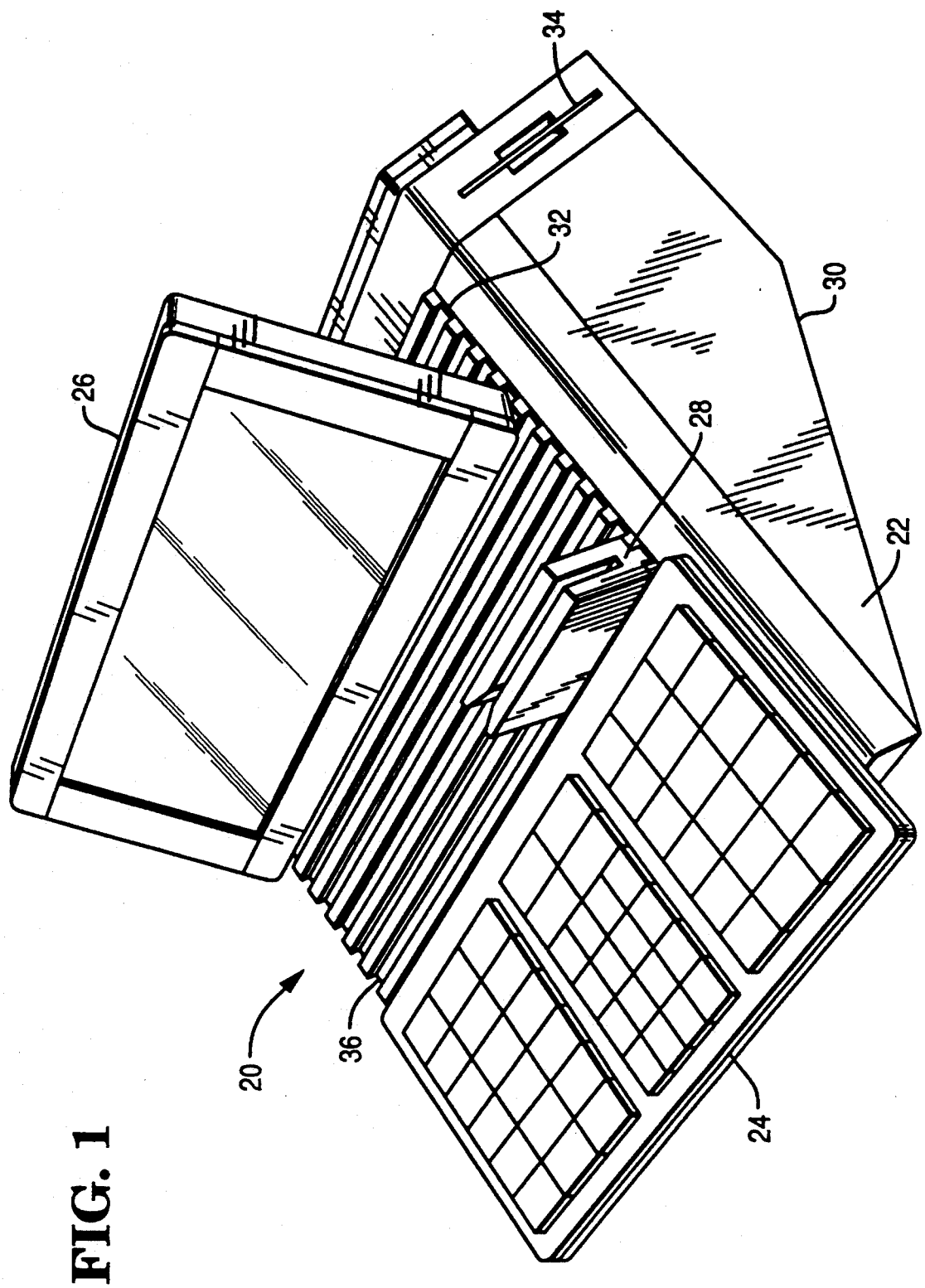
FIG. 1 is a perspective view of a modular business terminal, showing a base unit and a keyboard module, a magnetic stripe reader module, and a display module detachably secured thereto.

Referring now to FIG. 1, shown there is a modular terminal 20 which comprises a base unit 22, a keyboard module 24, a display module 26 and a magnetic card reader module 28. The base unit 22 is provided with an angled bottom surface 30 for supporting the base unit on a counter or other work area. The angled bottom surface 30 causes an upper surface 32 to be disposed at an angle from the horizontal to facilitate use of the terminal from an ergonomic standpoint. A floppy disk receptacle 34 is provided adjacent to the rear of the base unit 22 to enable programs or other data to be entered into the base unit 22, which contains processing, control, interfacing and other electronics which may be needed for a given application within its housing. The upper surface 32 contains a plurality of parallel grooves 36 for the purpose of receiving complementary structures on the keyboard module 24, the display module 26 and the magnetic card reader 28 to detachably secure such modules to the base unit, as will subsequently be described in greater detail. The rear surface 29 of the base unit 22 may also be provided with grooves 36 to enable the coupling of a further module, such as the module 31, of any appropriate type, thereto.

Figure 2:
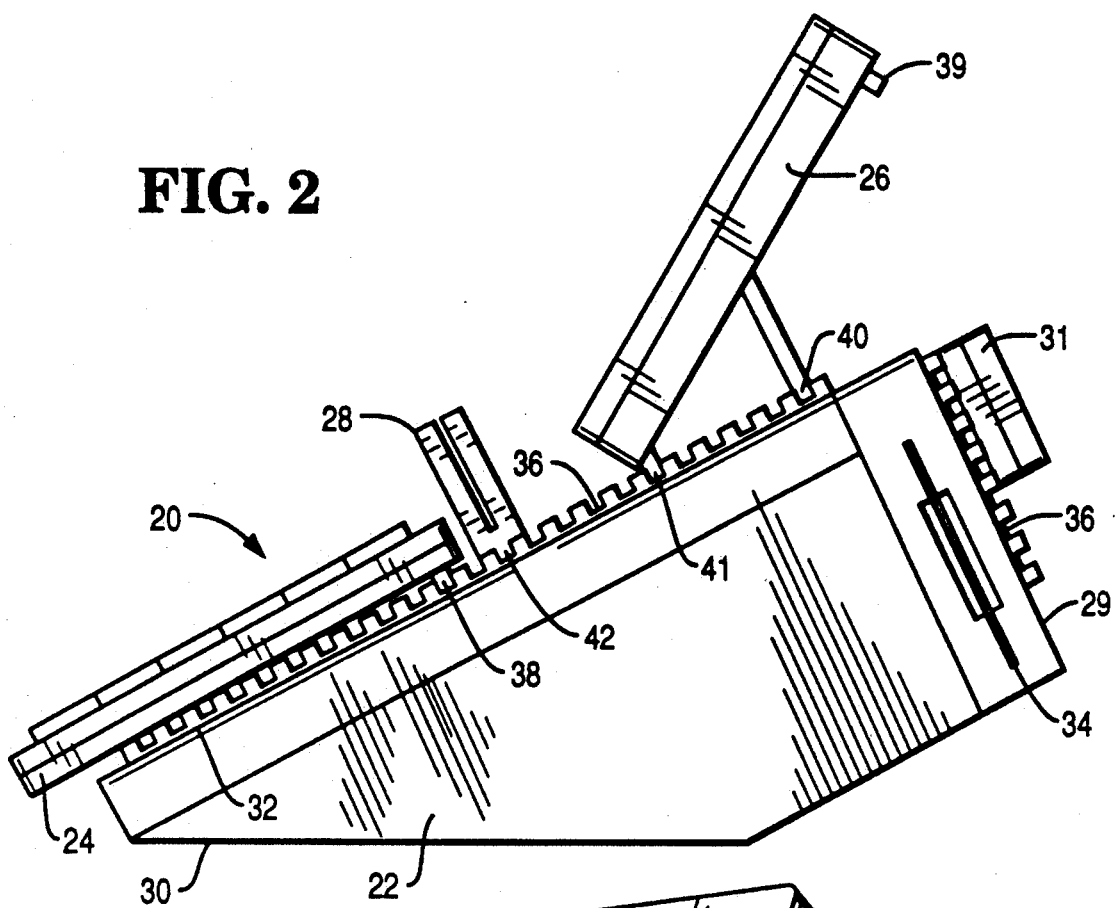
FIG. 2 is a right side elevation view of the modular business terminal of FIG. 1.

As can best be seen in FIG. 2, each of the modules is provided with a projection which engages one of the grooves 36. The engagement may be of the snap-fit type, to assure that the module will remain in position. Thus the keyboard module has a projection 38; the display module 26 has projections 39, 40 and 41; and the magnetic card reader 28 has a projection 42. These projections may be pivotally mounted within their respective modules to enable them to swivel so that the modules may be positioned at various angles with respect to the upper surface 32. With respect to the display module 26, it will be noted that only two of the three projections 39, 40 and 41 are actually in use at any one time.

Figure 3:
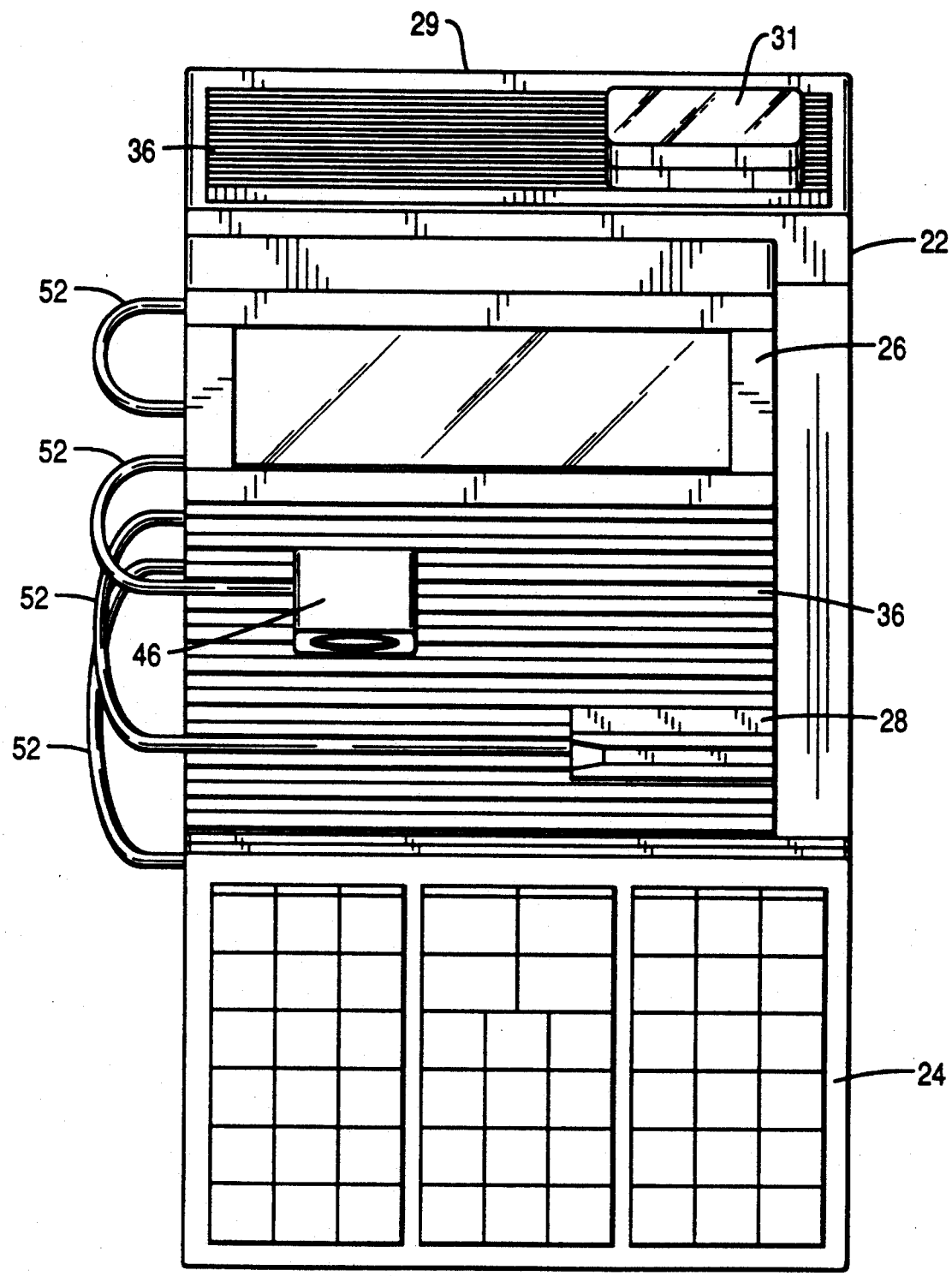
FIG. 3 is a plan view of the modular business terminal of FIG. 1, in which the keyboard module has been shifted to a different position on the base unit and a scanner module has been added.
Figure 4:
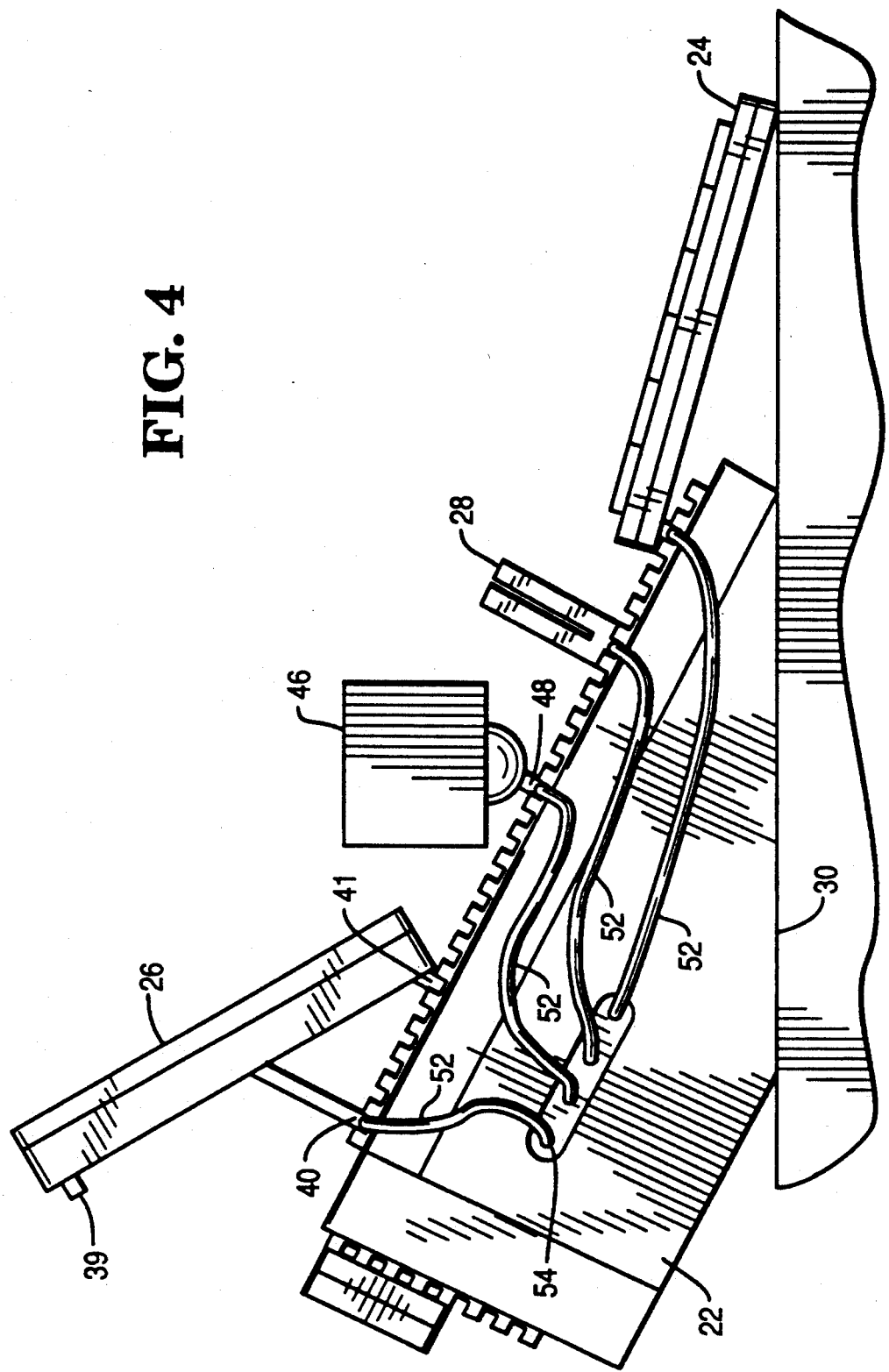
FIG. 4 is a left side elevation view of the modular business terminal of FIG. 3.
Figure 5:
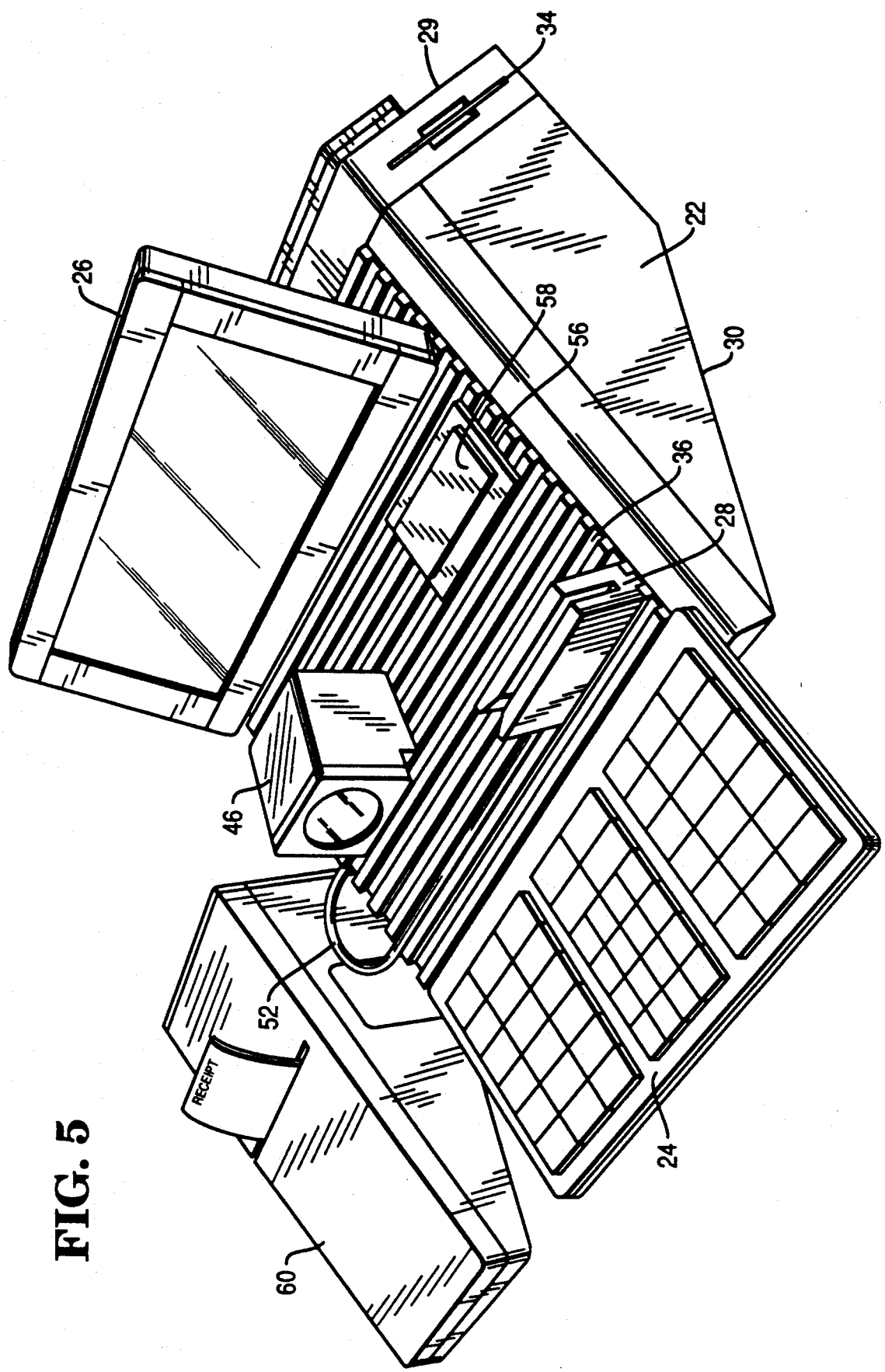
FIG. 5 is a perspective view of the modular business terminal of FIG. 3 with a printer coupled thereto.

One example of repositioning of the modules 24, 26 and 28 on the base unit 22 is shown in FIGS. 3, 4 and 5, in which the keyboard module 24 has been moved forward with respect to the base unit 22, so that its projection 38 is located in a groove 44 which is relatively much closer to the front of the base unit 22 than was the case in the arrangement shown in FIG. 1 and 2. This changes the angle of inclination of the keyboard module 24 and also frees a substantial part of the upper surface 32 so that an additional module may be added, if desired. In FIGS. 3, 4 and 5, a scanner module 46 has been added and is positioned on the upper surface 32 between the magnetic card reader module 28 and the display module 26. A projection 48 for the module 46 is positioned within a complementary groove 50 in the upper surface 32.

FIGS. 3-5 inclusive illustrate one method of electrically coupling the various modules to the base unit 22. This is accomplished by use of cables 52 which are connected at one end to each module, which are positioned within one of the grooves 36, and which are plugged at their other ends into receptacles located in one side of the base unit 22, as best shown in FIG. 4. Other means for providing data transmission coupling between the modules and the base unit 22 may also be employed, such as the use of complementary optical (including infra-red) elements in the grooves 36 and on the bottom surfaces of the various projections on the modules, or complementary electrical connections in the grooves 36 and on the bottom surfaces of the various projections on the modules.

With respect to FIG. 5, an additional module 56 is shown positioned on the upper surface 32. This module is essentially a base on which a further module can be mounted, said module having a bottom surface which has a recessed portion for receiving a complementary raised portion 58 on the module 56 to retain the further module in place. In addition, a printer 60 is shown positioned adjacent to the base unit 22, and can be coupled to the base unit 22 via a cable (not shown) similar to the cables 52. It will be seen that, if desired, a printer could be configured as a module having a projection which would engage one of the grooves 36, and could be located on the upper surface 32.

Figure 6:
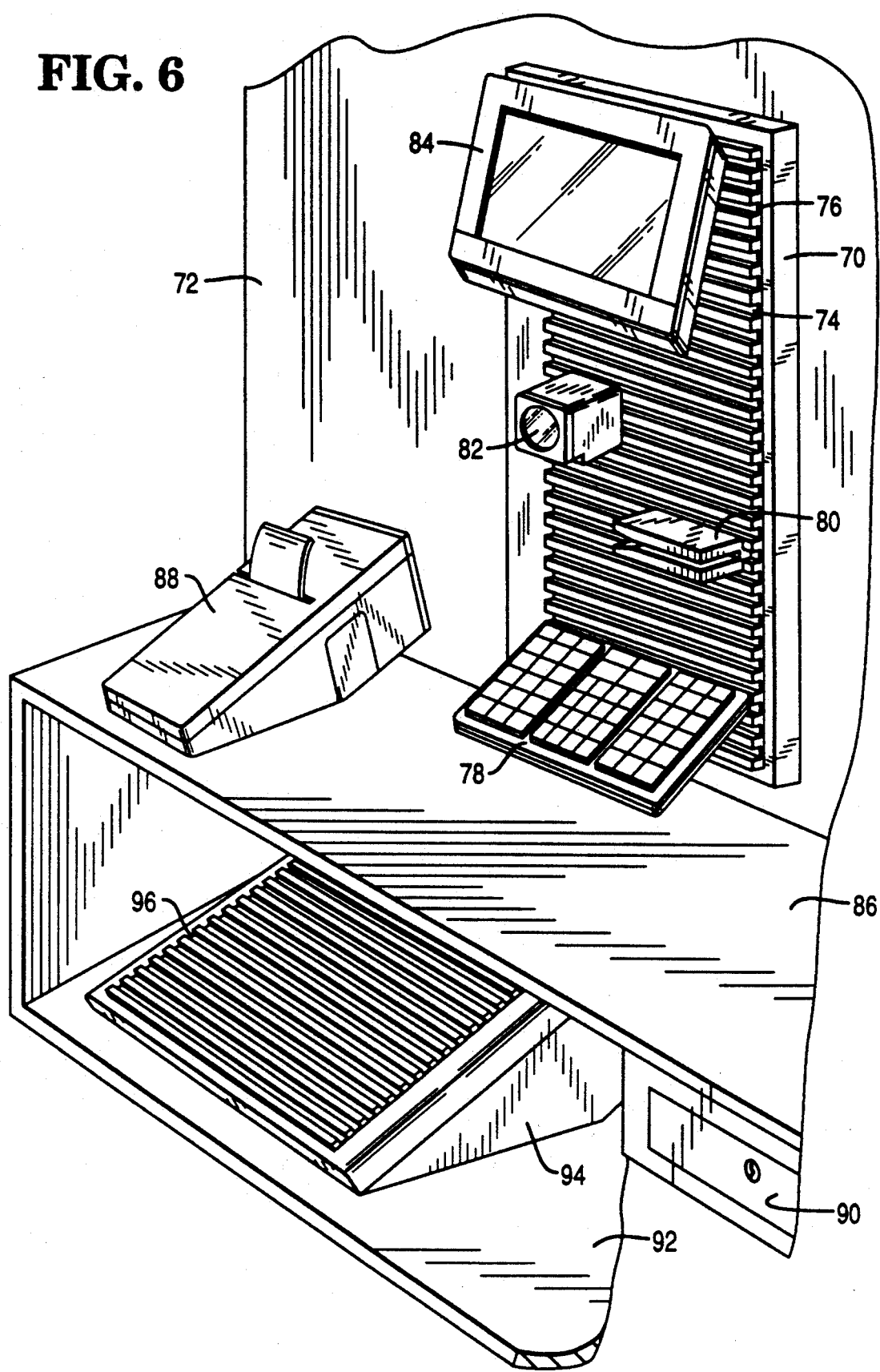
FIG. 6 is a perspective view of an embodiment of a modular business terminal which is associated with a counter and employs a generally vertical orientation.

Shown in FIG. 6 is an arrangement of a terminal system 68 which is similar to the arrangement shown in FIG. 1-5, but which is directed to minimizing the "footprint" required for the modular terminal by employing a wall-mounted, vertically-oriented base unit 70, which is shown secured by any suitable means to a wall 72. Grooves 74 in the vertical surface 76 of the base unit 70 receive complementary projections (not shown) on a keyboard module 78, a magnetic stripe reader module 80, a scanner module 82 and a display module 84 for retaining these modules in position on the base unit 70. The keyboard module 78 is shown as mounted on the base unit 70 in such a manner that it is tilted, and its lower end rests upon a counter 86. A printer 88 is shown resting on the counter 86 and can be connected by suitable cabling to the base unit 70.

If desired, the counter 86 may include a drawer 90, which can function as a cash drawer, and a lower surface 92, on which a second base unit 94 can be supported. This base unit may be provided with the same type of grooved upper surface 96 described above for the addition of appropriate modules, as desired.

Figure 7:
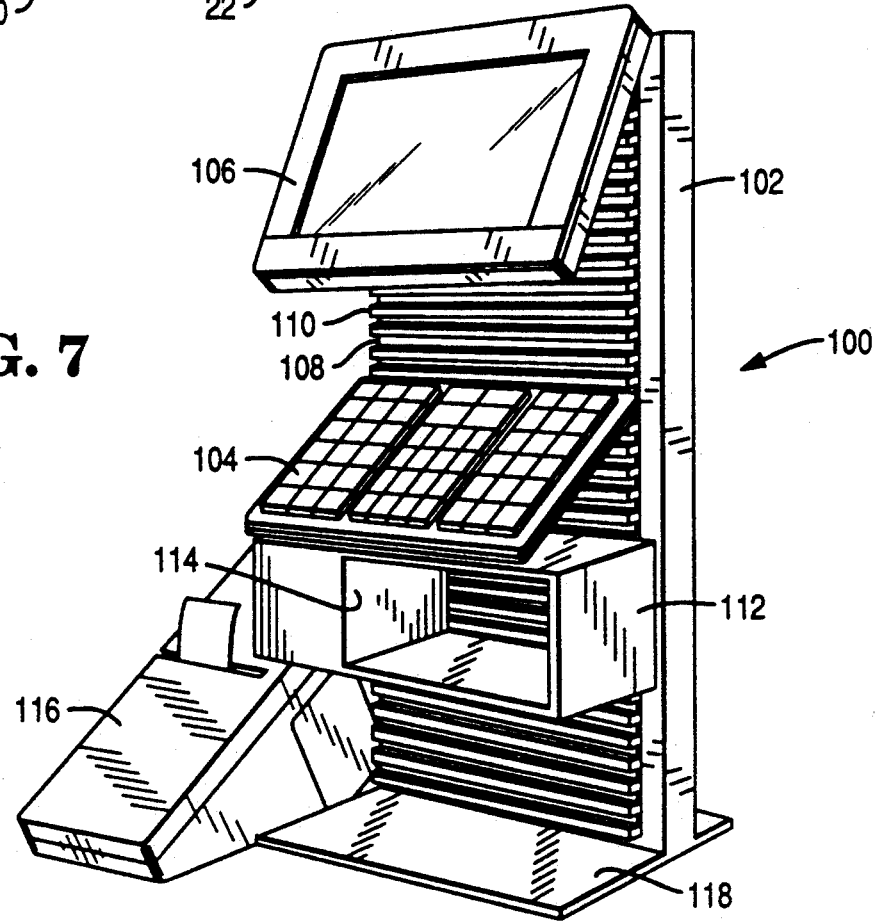
FIG. 7 (on the sheet with FIG. 2) is a perspective view of another version of a vertically oriented modular business terminal.

Shown in FIG. 7 is another embodiment of a vertically-oriented modular terminal system 100. The system includes a base unit 102, a keyboard module 104 and a display module 106. The modules 104 and 106 are mounted on the base unit 102 by means of projections (not shown) which engage grooves 108 on the vertical surface 110 of the base unit 102. A support 112 is also mounted on the vertical surface 110 of the base unit 102, and provides a support for the lower end of the keyboard module 104. In addition, the support 112 may also include a storage area 114. A printer 116 may be operatively coupled to the base unit 102, if desired. The base unit 102 may be supported in its vertical orientation by a platform 118 affixed thereto, which rests upon any suitable horizontal surface.

While the forms of the invention shown and described herein are admirably adapted to fulfill the objects primarily stated, it is to be understood that it is not intended to confine the invention to the forms or embodiments disclosed herein, for it is susceptible of embodiment in various forms within the scope of the appended claims.

What is claimed is:

1. A modular business terminal having a configuration which may readily be altered, comprising:
   a base unit having a docking surface on which are located a plurality of parallel grooves, each extending from one side of said docking surface to the other;
   at least one terminal module, each module having at least one projection which is inserted into one of the grooves of the docking surface to removably attach the terminal module to the base unit; and
   means for providing data coupling between the base unit and each attached terminal module.

2. The business terminal of claim 1, in which the means for providing a data coupling comprises a cable attached to each terminal module which is positioned within the groove used for attaching said terminal module to the docking surface, said base unit having a plurality of cable receptacles for receiving the ends of the terminal module cables for receiving the ends of the terminal module cables for establishing connections between the base unit and each attached terminal module.

3. The business terminal of claim 1, in which at least one of said terminal modules is a keyboard module.

4. The business terminal of claim 1, in which at least one of said terminal modules is a display module.

5. The business terminal of claim 1, in which at least one of said terminal modules is a magnetic stripe reader module.

6. The business terminal of claim 1, in which at least one of said terminal modules is a scanner module.

7. The business terminal of claim 1, in which the base unit includes a support surface on which the base unit rests, and in which the docking surface is angled with respect to the support surface for convenience in use.

8. The business terminal of claim 1, in which the base unit is a wall mounted unit.

9. The business terminal of claim 1, in which the docking surface is substantially vertical.

* * * * *